United States Patent

Guyot et al.

[11] Patent Number: 5,976,441
[45] Date of Patent: Nov. 2, 1999

[54] PROCESS FOR MANUFACTURING AN ARTICLE IN THE FORM OF A SLAB AND ARTICLE MANUFACTURED

[75] Inventors: Didier Guyot, Avon; Claude Champomier, Saint-Avertin, both of France

[73] Assignee: Materiaux de Construction International (M.C.I. S.A.), Courbevoie, France

[21] Appl. No.: 08/776,843
[22] PCT Filed: Jun. 14, 1996
[86] PCT No.: PCT/FR96/00914
  § 371 Date: Aug. 12, 1997
  § 102(e) Date: Aug. 12, 1997
[87] PCT Pub. No.: WO97/00161
  PCT Pub. Date: Jan. 3, 1997

[30] Foreign Application Priority Data

Jun. 15, 1995 [FR] France ................................... 95 07124

[51] Int. Cl.[6] ..................................................... B29C 47/00
[52] U.S. Cl. ................. 264/210.6; 264/333; 264/211.22; 264/210.8; 264/211.12; 264/280; 52/223.7; 52/293.3
[58] Field of Search ....................................... 264/176, 120, 264/210, 167, 280, 295, 211.12, 70, 71, 72, 333, 211.22, 210.8; 425/62, 63, 64, 111, 218, 219, 262, 427, 429, 432, 456, 421, 410; 428/517, 290, 921, 325, 516, 375, 920; 52/223.7, 293.3

[56] References Cited

U.S. PATENT DOCUMENTS

| | | | |
|---|---|---|---|
| 3,883,631 | 5/1975 | Murray | 264/210 R |
| 3,900,550 | 8/1975 | Oliver et al. | 264/295 |
| 4,305,965 | 12/1981 | Cheney | 426/104 |
| 4,623,388 | 11/1986 | Jatkar et al. | 75/232 |
| 4,773,838 | 9/1988 | Seppanen | 425/63 |
| 5,286,576 | 2/1994 | Srail et al. | 428/517 |
| 5,596,853 | 1/1997 | Blaney et al. | 52/223.7 |

*Primary Examiner*—Merrick Dixon
*Attorney, Agent, or Firm*—Oblon, Spivak, McClelland, Maier & Neustadt, P.C.

[57] ABSTRACT

A manufacturing process produces an article in slab form and more precisely an article made from a hydrated matrix which contains cement, sand, water and reinforcing fibers. The process includes the steps of mixing the constituents until a substantially homogeneous mineral paste is obtained; extruding the mineral paste in the form of a sheet having a thickness approximately equal to that of the article; and cutting the sheet to the size of the article. The article is made in the form of a slab and may be an imitative slate piece to be used as a roofing cover element.

22 Claims, 3 Drawing Sheets

PROCESS FOR MANUFACTURING AN ARTICLE IN THE FORM OF A SLAB AND ARTICLE MANUFACTURED

BACKGROUND OF THE INVENTION

1. Field of the Invention

The invention relates to a process for manufacturing an article in slab form and more precisely to an article comprising a hydrated matrix which contains cement and sand and is reinforced by fibres.

2. Description of the Related Art

The invention will be more particularly described for the manufacture of building covering elements, such as building roofing slabs imitating slate. However, the invention is not limited to this type of article and should be interpreted in a non-limiting way and as encompassing any type of article comprising a hydrated matrix which contains cement and sand and is reinforced by fibres.

It has already been proposed in European Patent Application Serial No. 165,388 to produce building roofing slabs imitating slate. It turns out that the articles obtained in accordance with the teaching of this document have a relatively high relative density (greater than 2) and are brittle. This brittleness prevents them from being produced with a small thickness without the risk of fracturing or cracking. The articles thus obtained are therefore unsuitable for forming roofing slabs.

The subject of the invention is thus a manufacturing process resulting in the production of thin slabs which may be conveniently used for building coverings, especially as roofing, and have the appearance of slate.

The French Patent Application Serial No. 93/15184 of the Applicant has already proposed such a manufacturing process. The process described according to this document includes in particular a rolling step which has two functions. First of all, this step confers the desired thickness on the articles produced. The second function of the rolling is to improve the orientation of the reinforcing fibres with the aim of obtaining isotropic mechanical properties. Although the process proposed by this document leads to lighter articles with the desired thickness without thereby increasing their brittleness, it does, however, require working conditions which are not very satisfactory because the rolling, which is carried out by contact with a succession of rolls, may run the risk of the matrix sticking on the rolls. Apart from the risk of degrading the matrix and therefore of increasing the production costs because of the loss of material, it is necessary to clean the equipment very frequently. This maintenance also leads to an increase in the costs. Should the matrix stick on the rolls, the latter may in fact carry off material which hardens and modifies the appearance of the surface of the rolls. The rolling operations are then rendered ineffective. It is therefore necessary to provide frequent cleaning of the equipment, which cleaning decreases the production rates and increases the cost.

SUMMARY OF THE INVENTION

The object of the invention is to provide a method for making thin slabs for building coverings. The method does not have the previously mentioned drawbacks, especially the fouling of the equipment during the rolling step and the risk of degrading the product being produced during this same step.

This object is achieved according to the invention by a process for manufacturing an article in the form of a slab, comprising a hydrated matrix which contains especially cement and sand and is reinforced by fibres, the said process comprising the following steps:

a) the constituents are mixed until a substantially homogeneous paste is obtained;

b) the paste is extruded in the form of a sheet having a thickness approximately equal to that of the article; and c) the sheet is cut to the size of the article.

The process thus described makes it possible to manufacture articles in slab form, especially those intended for building roofing slabs and therefore having, for the desired thickness, mechanical properties and a density which are suitable. The process according to the invention has meant, in particular, omitting the rolling step, with which the various drawbacks mentioned above were associated.

Although it is clear that the first function of the rolling step of the process mentioned previously is, according to the invention, fulfilled by the step consisting of extruding the paste in the form of a sheet having a thickness substantially equal to that of the article, it is not obvious that a result similar to that corresponding to the second function may be obtained. This is because the first function, which consists in conferring the desired thickness on the articles manufactured, is clearly replaced according to the invention by extruding the paste directly to the desired size of the finished article. As regards the second function of the rolling step, consisting, according to the process of the prior art, in reorient ing the reinforcing fibres in the already extruded paste, it appears, unexpectedly, that the reorientation of the fibres is not necessary because of the extrusion as proposed. It seems that an extrusion step which ends in a paste thickness close to or equal to that desired for the finished article, as the invention teaches, results in a two-dimensional orientation of the fibres in the paste, this orientation being satisfactory for the applications envisaged.

According to a preferred mode of the invention, provision is made to filter the paste before extrusion in order to remove impurities having a dimension similar to the thickness of the slab. It is not uncommon in fact for impurities having a dimension similar to or greater than the thickness of the article to form; these may be, for example, aggregates of raw materials or strands of reinforcing fibres. This filtration prevents fouling of the extrusion head which could disrupt the manufacture of the articles. It can be carried out, for example, by an advantageously mounted screen pack which is accessible so as to be easily cleaned and positioned sufficiently upstream of the extruder head so as not to disturb the manufacture when it becomes fouled and partially obstructed. This filtration furthermore improves the quality of the products, especially compared to the process mentioned previously which includes a rolling step. This is because in that process, when such impurities appear, they are ground up during the rolling step; however, this creates a defect in the finished article which is then scrapped. According to the invention, this type of defect no longer appears and articles of uniform quality are therefore obtained.

In a variant of the invention, provision is made to shape the article into the form of a slab by a vertical pressing operation. During this step, it is possible, for example, to confer on the upper face of the article the appearance of a natural slate by means of an upper mould.

A vertical pressing operation enables the article to be shaped without risk of disturbing its thickness. This is because, in the technique proposed in French Patent Application Serial No. 93/15184, the press initially makes an angle with the sheet to be shaped, which may disturb the uniformity of the article, since the material may creep at this stage in the production.

In another variant of the invention, in which the paste is extruded with a thickness slightly greater than that of the article, the vertical pressing operation is carried out between an upper mould and a lower counter-mould which include nonplanar shapes.

This other variant makes it possible, for example, to produce covering elements which include reliefs serving to fix the elements to a support and/or to fix them together.

The articles produced according to one or another of these variants may therefore have one face imitating slate and possibly include shapes to be used especially for fixing and for sealing.

With a view to further improving the surface finish of the article imitating slate, in such a way that it resembles even more a natural slate, the invention makes provision for accompanying the vertical pressing operation with vibration. This vibration especially reduces the porosity of the surface by closing up the sink marks. This vibration is advantageously a vertical vibration whose frequency is between 30 Hz and 150 Hz and preferably between 75 and 100 Hz and more preferably equal to 87 Hz and whose amplitude is less than 2 mm and preferably equal to 0.9 mm.

As regards the pressure, this is between 0.5 and 5 bar and in particular can be lower when the pressing operation is accompanied by vibration.

The invention also provides an article in the form of a slab, obtained according to the process which has just been described. This article in the form of a slab is characterized by a hydrated matrix which contains cement and sand and is reinforced by fibres, the hydrated matrix containing 100 parts by weight of cement, 80 to 120 parts by weight of sand with a particle size of less than 1 mm and the fibres being alkali-resistant glass fibres present in a proportion of between 3 and 4% by weight with respect to the dry matter without the glass, the article preferably having a relative density not exceeding 1.85.

A glass-fibre content of less than 3% leads to insufficient reinforcement. A content greater than 4% may lead to difficulties of a Theological nature, that is to say the paste exhibits insufficient plasticity, especially for its shaping treatment. In a preferred variant, the fibre content is less than 3.5% in order to guarantee satisfactory plasticity and to improve the production results.

The glass fibres preferably have a length/diameter ratio of between approximately 100 and 200:1. The composition of the article thus described is especially well suited to the manufacturing process described previously. It turns out in particular that the glass-fibre content is less than that recommended by French Patent Application Serial No. 93/15184, but leads to perfectly satisfactory results, the articles obtained having good mechanical properties for the desired thickness and, in particular, good ductility.

According to an advantageous form of the article, the latter has a surface with a porosity whose pores are of a very small diameter, said surface thus appearing locally smooth. This smooth appearance is only local, especially in the case of a surface having the appearance of a slate.

The water content is preferably between 16.5 and 21.5% by weight with respect to the dry matter. Below 16.5% it is no longer possible to process the paste and above 21.5% free water remains in the paste, possibly leading to excessive porosity in the finished product.

The hydrated matrix may advantageously contain ultrafine particles, especially silica fume or metakaolin, in a quantity of 8 to 18 parts by weight and preferably equal to 10 parts by weight. The function of these particles is especially to facilitate the extrusion by improving the plasticity of the paste and to improve the mechanical properties of the article. These effects are insufficient below 8 parts by weight, while above 18 parts by weight the plasticity drops excessively during extrusion. The proposed metakaolin is kaolin treated at 800° C. so that it becomes pozzolanic. The expression "ultrafine particles" is used to mean, in general, particles whose BET specific surface area is between 10 and 30 $m^2/g$.

Still in order to improve the extrusion, and especially to improve the slip effect of the paste, the invention advantageously provides for the addition of an extrusion agent chosen from the cellulose ethers, such as methylhydroxyethylcellulose (MHEC), in a quantity of approximately 1 part by weight.

The matrix may also contain, for the purpose of coloring the article, a colorant, such as carbon black, in a quantity of 0.5 to 2 parts by weight and preferably of 1 part by weight. Choosing carbon black advantageously leads to a color which is very similar to that of natural slate and is stable over time.

In a preferred variant of the invention, the article has at least one face imitating slate.

In this case, it preferably has a thickness in its central part of less than 1 cm and preferably less than 6 mm.

Such an article then has all the properties required for forming a building covering element having good mechanical properties.

Such articles may therefore be use as building roofing elements in the same way as natural slates.

In another variant, the article, along one edge, has catching reliefs projecting downwards and an upper surface which imitates slate and is possibly provided with ribs. The concepts of reliefs projecting downwards and an upper imitative surface are related to the position of the article used as a roofing element. According to this variant, the articles allow, especially when fitting them, small overlap regions, corresponding, that is to say, to the region of the upper ribs.

BRIEF DESCRIPTION OF THE DRAWINGS

Further details and advantageous characteristics of the invention will emerge from the description of the embodiments according to the invention, given with reference to FIGS. 1, 2, 3, 4 and 5, which depict.

DETAILED DESCRIPTION OF THE PREFERRED EMBODIMENTS

The various figures are diagrams of examples of products or installations according to the invention, the sizes of which are not drawn to scale. They are simplified and certain details are drawn out of proportion so as to make the invention simpler to understand.

Figure 1:
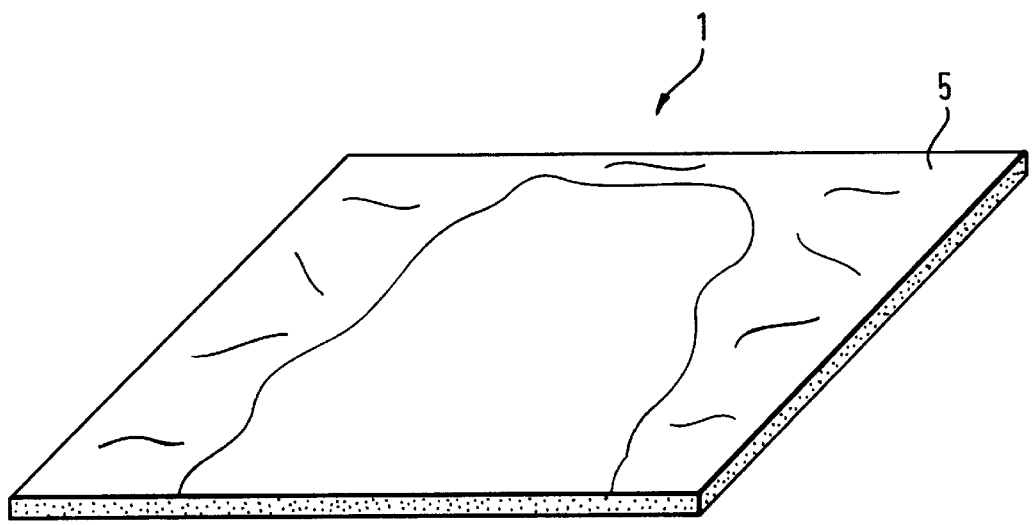
FIG. 1 a diagram of a perspective view of an article in accordance with the invention.

FIG. 1 depicts a first possible embodiment according to the invention. This is a "flat" thin slab 1 imitating slate. Such slabs 1 are produced with a black or anthracite color and have a face 5 which includes a relief, shown diagrammatically in part in the figures, imitating the surface of a natural slate. They have a thickness in their central part of about 5 to 6 mm.

Figure 2:
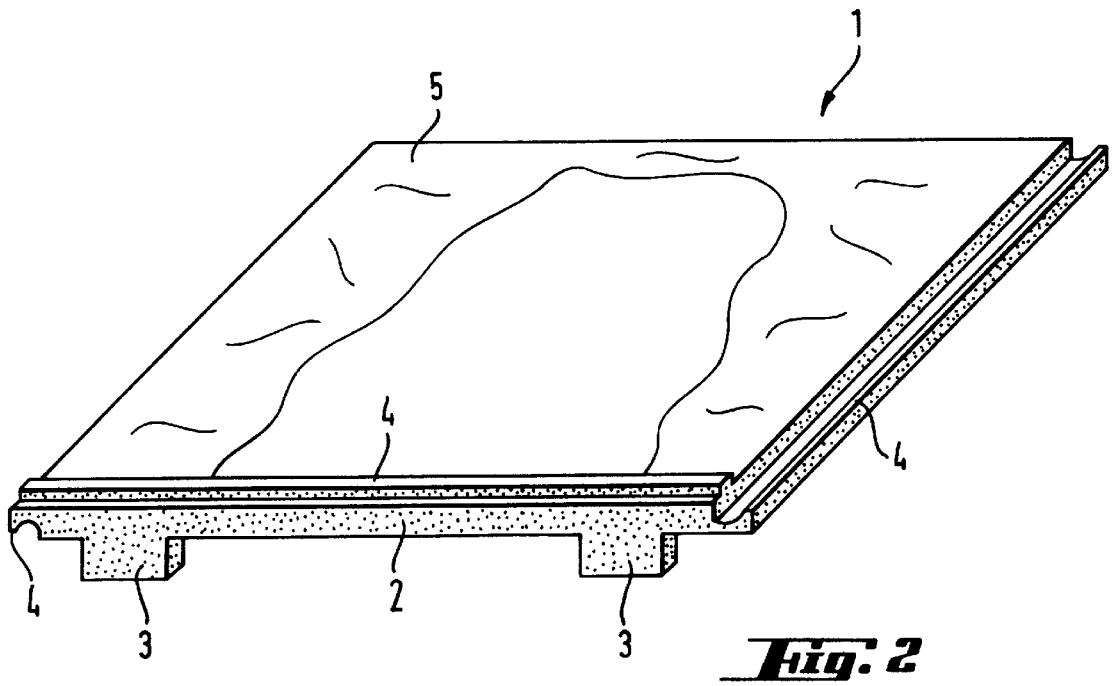
FIG. 2 a diagram of a perspective view of another article according to the invention.

According to another embodiment of the invention, depicted in FIG. 2, the slab 1 has a thickness in its central part of about 9 mm and is provided along one edge 2, forming in service the upper edge of the slab, with catching reliefs 3 projecting downwards with a height of about 8 mm; it also has joint-ribs 4 on its upper surface 5, that is to say on the surface imitating the surface of a natural slate, along the upper edge and along the two side edges. The side edges have a thickness which is reduced by approximately a half, one from the top and the other from the bottom, and their ribs 4 are, in the first case, directed upwards and, in the second case, downwards, so as to allow a slab 1 to fit into the adjacent slabs. In addition, the lower edge of the slab 1 has a recess, not depicted in the figure, designed to receive the rib 4 of the upper edge of the slabs 1 lying immediately above it.

The slabs 1 typically have dimensions ranging from 200×300 mm to 300×600 mm and possibly 600×600 mm, and are relatively light, with a relative density of about 1.8.

In each embodiment, the upper surface of the slab 1 has irregularities in the face 5 imitating slate, called "slating cleavage", shown diagrammatically in part in the figures.

The slabs 1 are ductile: they have a tensile strength of about 14 to 18 MPa and an elongation at breakage of at least 0.15%.

These slabs 1 may therefore be used for the roofing of a building. Those slabs 1 in FIG. 1 will be installed conventionally, like natural slates, and those depicted in FIG. 2 allow interlocking by means of the ribs 4 which limit the overlaps of the slabs 1 one with another.

Figure 3:
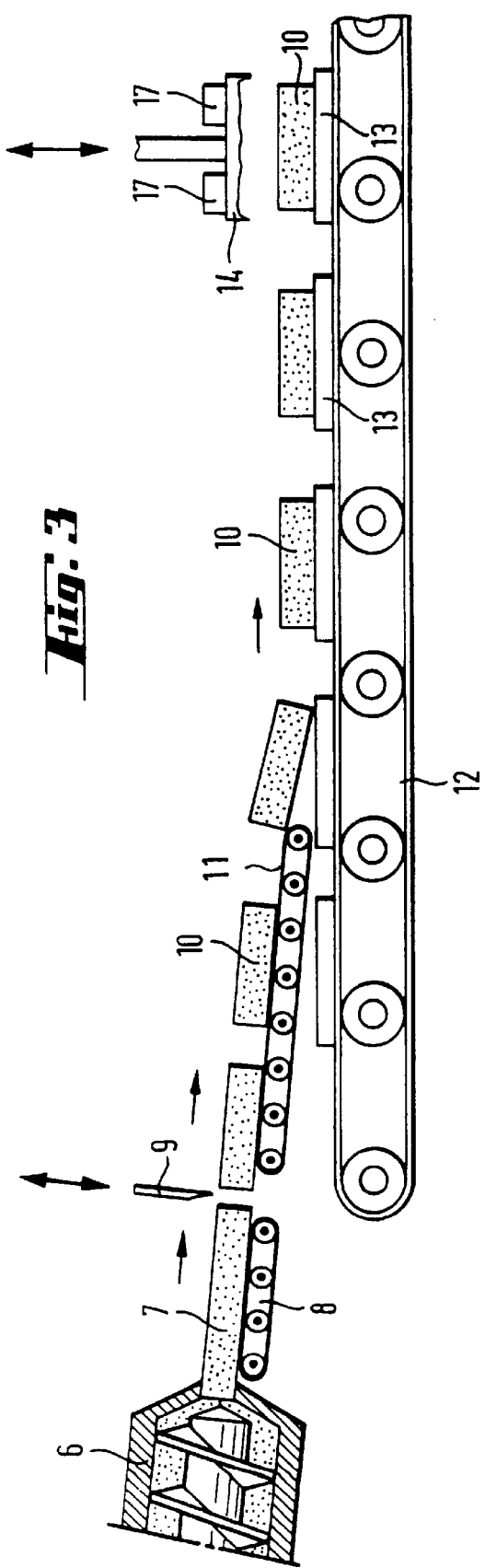
FIG. 3 a diagram of a device for implementing the invention.

FIG. 3 illustrates highly diagrammatically a device for producing the slabs 1. First of all, a paste is prepared by mixing a number of constituents described hereinbelow. The mixing, not depicted in the figures, may be carried out by any technique known to one skilled in the art, for example, in a vessel, or in one or more mixing screws which may also be used for the extrusion.

The starting paste is produced with the following constituents, which form a hydrated matrix reinforced by glass fibres:

1. Matrix
  1.1. Dry matter
  High-quality Portland cement, for example HPR cement: 100 parts by weight,
  Silica fume: 10 parts by weight,
  Fine sand of particle size less than 800 $\mu$m: 100 parts by weight,
  Extrusion agent: methylhydroxyethylcellulose (MHEC), approximately 1 part by weight,
  Black colorant (carbon black): approximately 1 part by weight;
  1.2. Water: 19% by weight with respect to dry matter.
2. Reinforcing fibres These are alkali-resistant glass fibres present in a proportion of 3.5% by weight with respect to the dry matter without the glass. These fibres may especially be fibres having a length of 6 to 12 mm, consisting of two hundred 14 $\mu$m diameter filaments, i.e. a length/diameter ratio of between approximately 100 and 200:1. Suitable glass fibres are fibres with a water-insoluble size, these being available commercially under the name "Cemfil".

All the constituents described above are mixed relatively intensely and briefly in order to obtain a thick paste, roughly having the consistency of a plasticine, in which the glass fibres have remained intact.

After the mixing step, the paste is conducted along an extruder screw 6 and then extruded in the form of a sheet 7 with a thickness approximately equal to that of the slab 1 in the finished state. The dimensions of the sheet 7 are obtained by the choice of a suitable extruder head or nozzle. The strip 7 is taken up on a conveyor belt 8. Placed within the device or extruder screw 6 is a filter, not depicted in the figures, which will remove all the impurities which could disrupt the extrusion. As was stated earlier, these impurities may form from aggregates of raw materials or from strands of fibres and may reach the desired size of the article and, consequently, of the extruder head. In order to prevent the latter from becoming obstructed and therefore from disrupting the formation of the sheet 7, it is preferable to stop these impurities before they have reached the extruder head. The filter may consist of a screen pack, the slits of which are chosen so as to retain the impurities which may disrupt the manufacture. The screen pack is advantageously mounted sufficiently upstream of the extruder head so that, when the former becomes fouled by the presence of impurities, the extrusion cannot be disrupted. Moreover, the screen pack is designed to be accessible, in order to be cleaned easily, frequently and without interrupting the production.

A transverse-cutting device 9 forms, from the sheet 7, a succession of blocks 10 which then have approximately the dimensions of the finished slab 1. These blocks 10 are then taken up by a second conveyor 11 which guides these blocks 10 to a third conveyor 12 carrying a succession of supports 13. This third conveyor 12 goes under the conveyor 11 and makes an angle with the latter so as to create a point where these two conveyors meet. The speeds are synchronized in such a way that, at the end of the conveyor 11, each support 13 receives one block 10, always in the same relative position.

The supports 13 will be described in more detail later, especially with reference to FIGS. 4 and 5. Each block 10 carried by a support 13 is thus conducted to a shaping unit.

This shaping unit includes one or more shaping plates 14 which fit over and press down on one or more blocks 10 simultaneously. A single plate 14 is depicted in FIG. 3. The lower surface of the plate 14 reproduces the pattern or relief of the surface of natural slate; this pattern will preferably have been moulded directly from a natural slate. The pressing time is generally less than 10 seconds and preferably about 5 seconds. The pressure exerted by the plate 14 during shaping is between 0.5 and 5 bar. This pressure may be decreased especially when it is accompanied by vibration. The function of this vibration is essentially to improve the surface finish of the upper face of the slab 1, that is to say the face imitating the appearance of slate. The use of this vibration makes it possible to obtain, locally, a smoother surface while still preserving the imitation slate relief; it seems that the vibration makes it possible to close up the pores or the "micro-defects" appearing at the surface of the blocks 10. The use of vibration also contributes to improving the Theological properties of the material.

In the case of the production of a slab 1 in accordance with FIG. 1 and having dimensions of 300×600 mm, the vibration is determined by the following parameters: a frequency of 87 Hz and an amplitude of 0.9 mm; the pressure exerted by the shaping plate 1 is then approximately 1 bar.

The vibration described above may be produced by any means known to one skilled in the art, for example by one or more vibrators 17 connected to the plate 14 and transmitting the vibration via the plate 14.

The vibration mentioned above also has the advantage of simplifying the demoulding or removal from the shaping plate 14 after pressing a block 10, as the material of which the block 10 is composed does not stick at all and detaches very simply from the plate 14.

Figure 4:
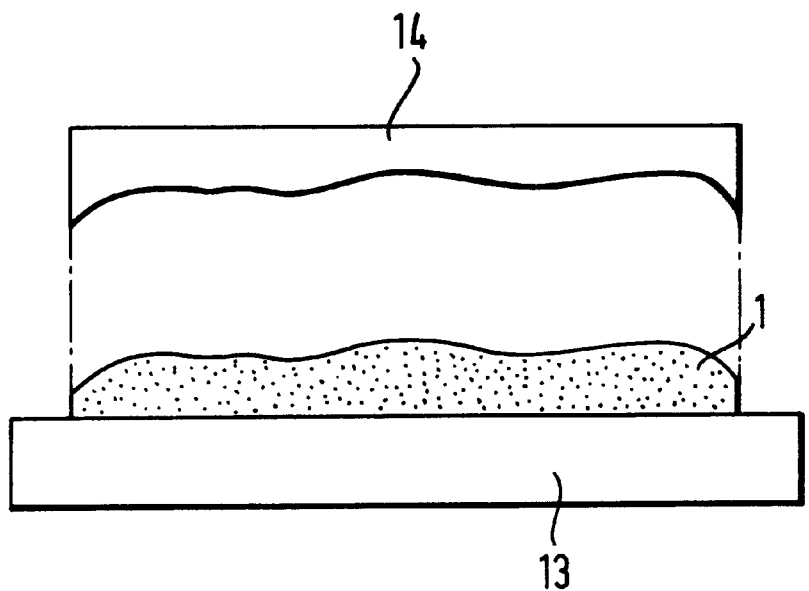
FIG. 4 a diagram of one section in the device for producing an article, as depicted in FIG. 1.
Figure 5:
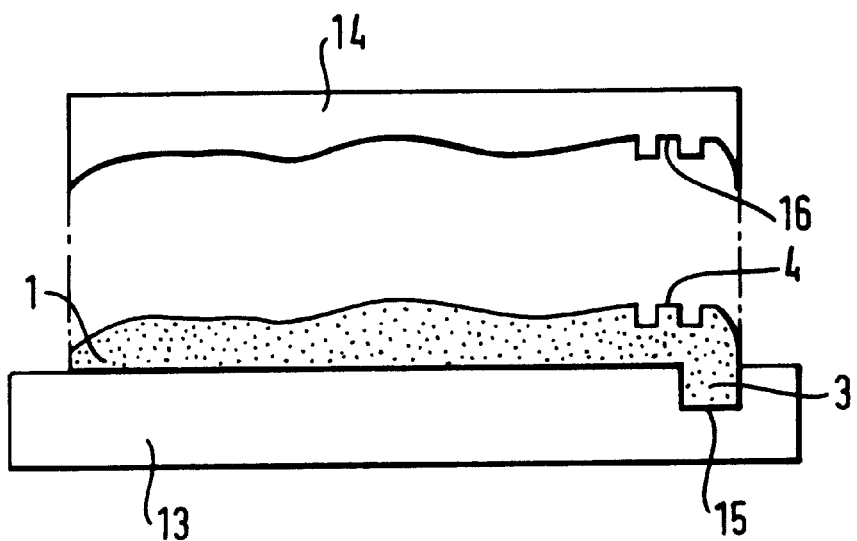
FIG. 5 a diagram of the same section in the device for producing an article as depicted in FIG. 2.

FIG. 4 diagrammatically illustrates the final phase of pressing a block with a view to obtaining a slab 1 in accordance with that depicted in FIG. 1. Likewise, FIG. 5 depicts this same phase for a slab 1 in accordance with that depicted in FIG. 2. The productions of these two types of slab 1 differ in a number of ways, especially in the choice of different shaping plates 14 and supports 13, which may be termed respectively the upper mould 14 and the lower counter-mould 13.

In the case of the flat slabs 1 in FIG. 1, the shaping takes place on flat supports 13 whereas in the case of the slabs 1 having reliefs 3 and 4, in FIG. 2, supports 13 are used which have recesses 15 into which the paste is forced during shaping in order to form the reliefs 3. As regards the upper reliefs 4, these are formed by recesses 16 with which the shaping plates 14 are provided.

Moreover, in the case of the production of slab 1 according to FIG. 1, the extruded sheet 7 has dimensions similar to the finished article but slightly greater, so that the amount of material making up one block 10 is sufficient to form the reliefs or ribs 3 and 4 and therefore to fill the recesses 15 and 16.

Moreover, the lower recesses 16 of the shaping plates 14 may be produced from various imprints of natural slates, each imprint advantageously corresponding to the same volume. In this manner, since the amount of material of each block 10 is the same, it is possible to avoid as far as possible any risk of material flash during shaping.

Following the pressing step, the supports 13 carrying the slabs 1 having the desired shape are conducted with the slabs 1 to the final stage of manufacture which consists in stoving them and varnishing them in order to obtain the final, slate-imitating, relatively light and ductile product which was described previously.

We claim:

1. Process for manufacturing an article in the form of a slab having a hydrated matrix which contains especially cement and sand and is reinforced by fibres, characterized in that the process comprises the following steps:
   a) mixing the constituents of the matrix, i.e., cement, sand, water and reinforcing fibres until a substantially homogeneous mineral paste is obtained;
   b) extruding the mineral paste in the form of a continuous sheet having a thickness approximately equal to that of the article; and
   c) cutting the sheet to the size of the article.

2. Process according to claim 1, characterized in that the process further comprises, after the mixing step but before the extruding step, a step of filtering the mineral paste in order to remove large impurities having a dimension similar to the thickness of the slab.

3. Process according to claim 1, characterized in that the process further comprises, after the cutting step, a step of shaping the article into the form of a slab by a vertical pressing operation.

4. Process according to claim 3, in which the mineral paste is extruded in the form of a sheet having a thickness approximately equal to but greater than that of the article, characterized in that the shaping step further comprises a substep of carrying out the vertical pressing operation between an upper mould and a lower counter-mould which include nonplanar shapes.

5. Process according to claim 3, characterized in that the vertical pressing operation is accompanied by vibration.

6. Process according to claim 5, characterized in that the vibration is vertical and in that its frequency is between 30 Hz and 150 Hz and preferably between 75 Hz and 100 Hz and more preferably equal to 87 Hz, and in that its amplitude is less than 2 mm and preferably equal to 0.9 mm.

7. Process according to claim 3, characterized in that during the pressing operation the pressure is between 0.5 and 5 bar.

8. Process according to claim 2, characterized in that the process further comprises, after the cutting step, a step of shaping the article into the form of a slab by a vertical pressing operation.

9. Article in the form of a slab comprising a hydrated matrix which contains especially cement and sand and is reinforced by fibres, characterized in that the hydrated matrix contains 100 parts of weight of cement and 80 to 120 parts by weight of sand with a particle size of less than 1 mm and in that the fibres are alkali-resistant glass fibres present in a proportion of between 3 and 4% by weight with respect to the dry matter without the glass.

10. Article according to claim 9, characterized in that the article has a relative density not exceeding 1.85.

11. Article according to claim 9, characterized in that the alkali-resistant glass fibres are present in a proportion of less than 3.5% by weight with respect to the dry matter without glass.

12. Article according to claim 9, characterized in that the hydrated matrix contains between 16.5 and 21.5% of water by weight with respect to the dry matter.

13. Article according to claim 9, characterized in that the glass fibres have a length/diameter ratio of between approximately 100 and 200:1.

14. Article according to claim 9, characterized in that the hydrated matrix furthermore contains ultrafine particles, especially silica fume or metakaolin, in a quantity of 8 to 18 parts by weight and preferably 10 parts by weight.

15. Article according to claim 9, characterized in that the hydrated matrix furthermore contains an extrusion agent chosen from one of the cellulose ethers in a quantity of approximately 1 part by weight.

16. Article according to claim 9, characterized in that the hydrated matrix furthermore contains a colorant in a quantity of between 0.5 and 2 parts by weight and preferably 1 part by weight.

17. Article according to claim 9, characterized in that the article is shaped and has at least one face imitating slate.

18. Article according to claim 17, characterized in that at least the imitation slate face has locally a smooth surface with pores that are at least partially closed.

19. Article according to claim 17, characterized in that the article is intended for use as a building covering element and has a thickness in its central part of less than 1 cm and preferably less than 6 mm.

20. Article according to claim 19, characterized in that along one edge the article has catching reliefs projecting downwards and an upper surface which imitates slate and is provided with ribs.

21. Article according to claim 15, characterized in that one of the cellulose ethers is methylhydroxyethylcellulose (MHEC).

22. Article according to claim 16, characterized in that the colorant is carbon black.

* * * * *